United States Patent [19]

Webb et al.

[11] Patent Number: 4,488,201

[45] Date of Patent: Dec. 11, 1984

[54] A.C. POWER ENTRY MODULE

[75] Inventors: Fred C. Webb, Wauconda; Michael B. Head, Arlington Heights; William P. Cegles, Lake In The Hills, all of Ill.

[73] Assignee: Corcom, Inc., Libertyville, Ill.

[21] Appl. No.: 466,627

[22] Filed: Feb. 15, 1983

[51] Int. Cl.[3] .......................... H02B 1/18

[52] U.S. Cl. .......................... 361/334; 323/346; 337/8; 337/188; 337/211

[58] Field of Search .......................... 337/4, 8, 9, 11, 188, 337/196, 210, 211, 212; 361/357, 360, 430, 431, 334, 335; 323/346

[56] References Cited

U.S. PATENT DOCUMENTS 3,084,308 4/1963 Porter .......................... 337/188

3,728,586 4/1973 Inhelder et al. .......................... 337/4

FOREIGN PATENT DOCUMENTS 1447124 6/1966 France .......................... 337/8

*Primary Examiner*—William H. Beha, Jr.

*Attorney, Agent, or Firm*—Hill, Van Santen, Steadman & Simpson

[57] ABSTRACT

An A.C. power entry module for supplying A.C. power to equipment which provides A.C. fusing, power on-off switching, RFI filtering and selection of voltage. The module can be utilized for both U.S. and European style fusing and a number of different voltage options are available which can be selected by merely changing the position of a circuit board. The contacts for engaging the fuses are mounted such that an operator cannot come in contact with them and the European or U.S. fuses can be easily selected by inverting a fuse holder board.

7 Claims, 11 Drawing Figures

FIG. 8
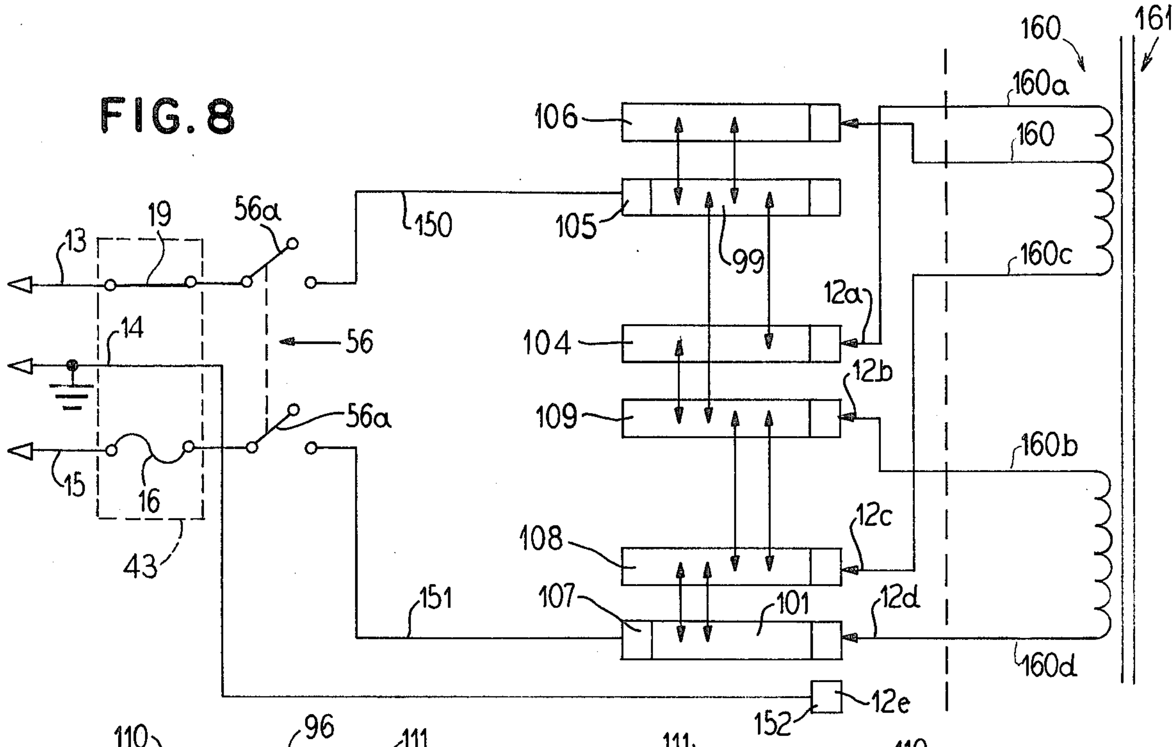
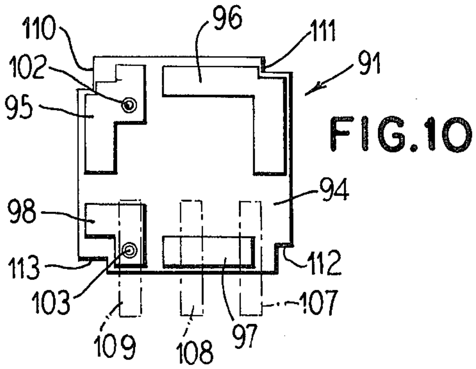
FIG. 10
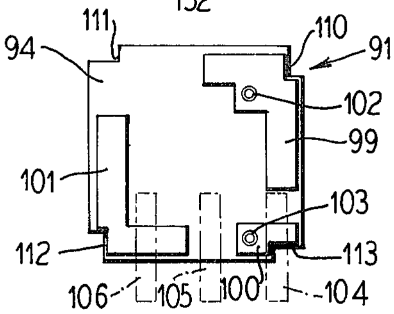
FIG. 11
FIG. 9
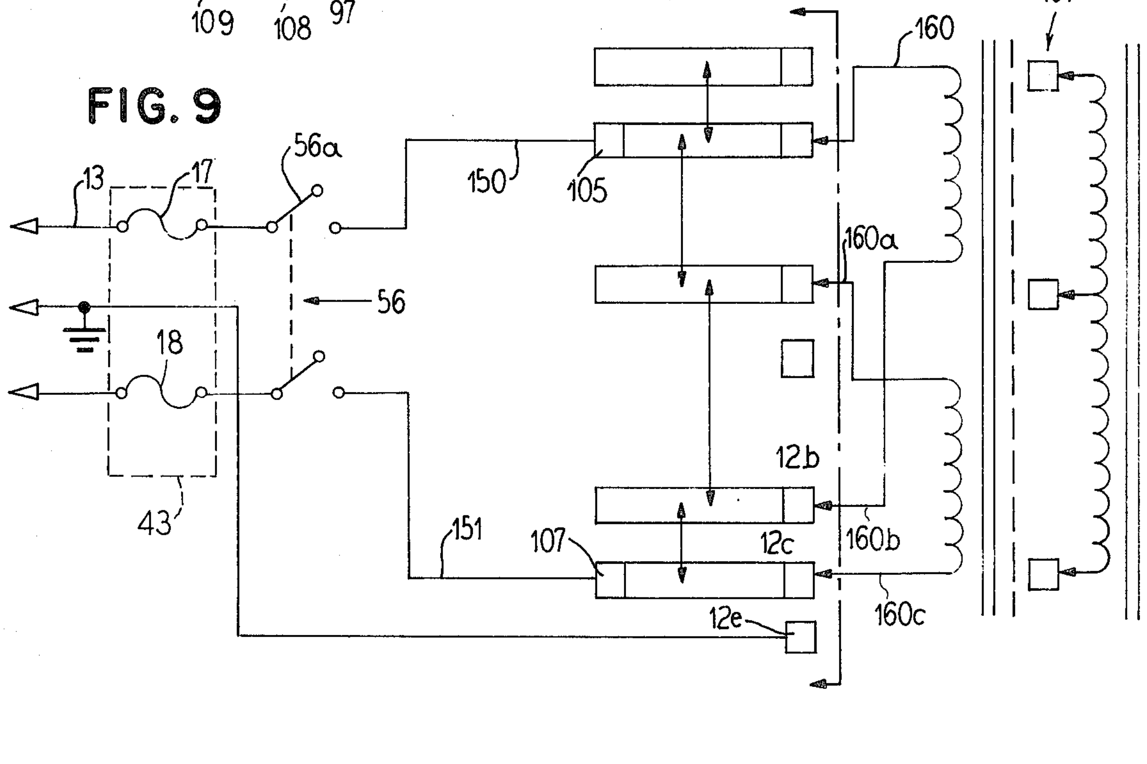

A.C. POWER ENTRY MODULE

BACKGROUND OF THE INVENTION

1. Field of the Invention

This invention relates in general to A.C. power entry modules and in particular to a novel entry module which provides for both domestic and European style fusing as well as for selection of a desired operating voltage.

2. Description of the Prior Art

U.S. Pat. No. 3,728,586 discloses an A.C. power module with an integral mechanical safety door that must be moved to a position which requires disconnecting the input power line to the module when a fuse is to be changed.

SUMMARY OF THE INVENTION

The present invention relates to a novel A.C. power entry module which includes power on-off switching and A.C. fusing. Removal of the power cord is required before the fuse holder can be removed.

The present invention provides a circuit board which can be moved to different positions so as to change the selected voltage.

The invention comprises a novel fuse holder which has a plate with fuses mounted on both sides with the plate held by a pair of fingers such that the fuse plate can be removed and turned over and replaced in the fingers so as to connect different size fuses.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 8 is an electrical schematic of the invention;

FIG. 9 is an electrical schematic illustrating two fuses with one in each of the lines;

FIG. 10 shows one side of the switching board; and FIG. 11 shows the other side of the board.

DESCRIPTION OF THE PREFERRED EMBODIMENTS

Figure 1:
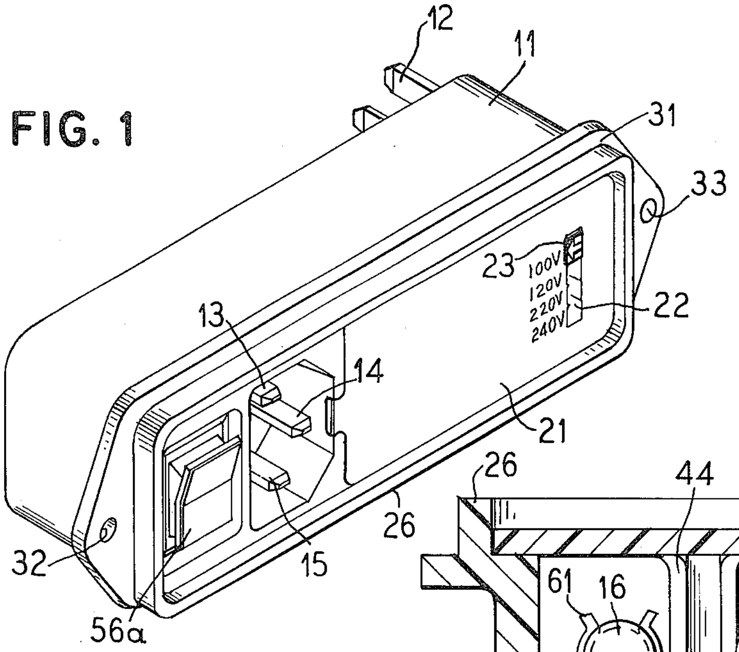
FIG. 1 is a perspective view of the A.C. power entry module of the invention.
Figure 4:
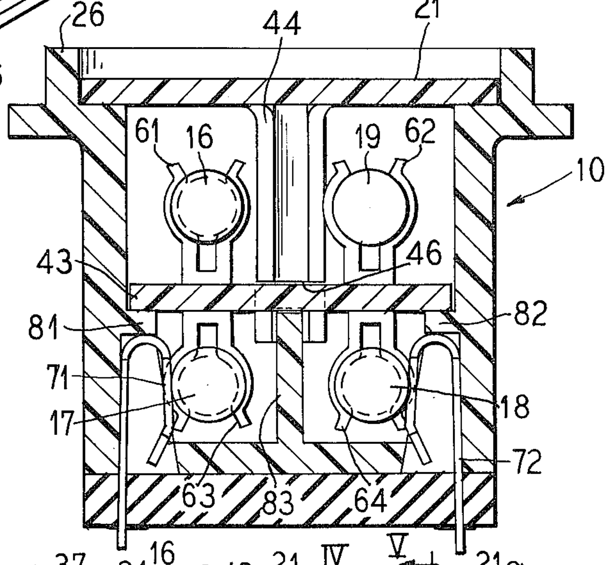
FIG. 4 is a sectional view taken on line IV—IV from FIG. 3.
Figure 3:
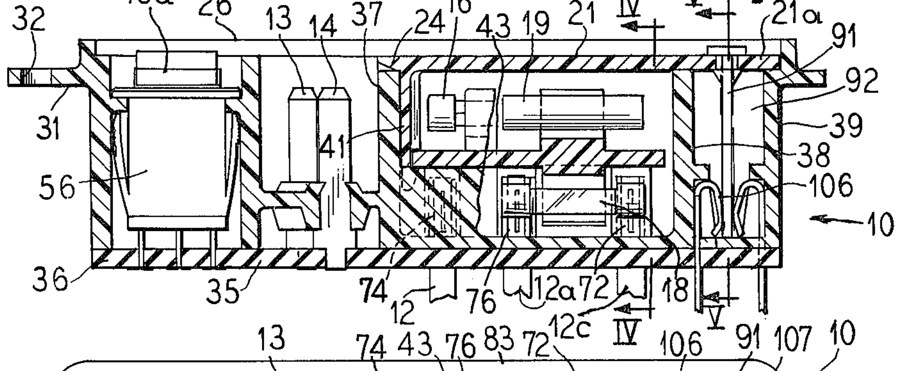
FIG. 3 is a side sectional view of the invention.
Figure 7:
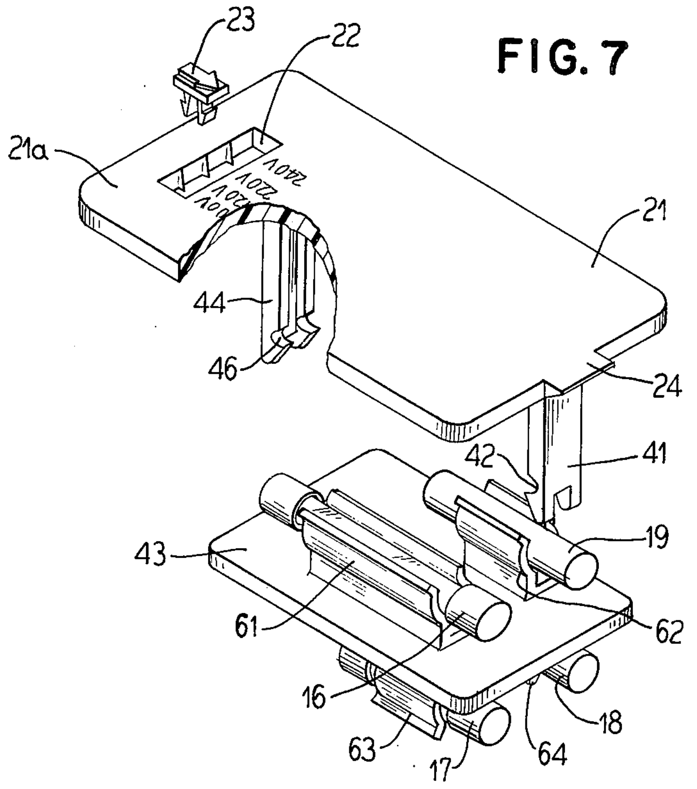
FIG. 7 is a partially cut-away perspective view of the fuse holder.

FIGS. 1 through 5 illustrate the module 10 which has a case 11 with input electrical contacts 13, 14 and 15 to which a suitable power cord can be connected and an on-off switch contact 56*a* which controls a switch 56. Output contacts 12 are mounted on the module and are received in an input connector of a suitable equipment which is to be energized by the module 10. A slot 22 receives a voltage indicator 23 which is slidably mounted in the slot so as to indicate the voltage which has been selected. A rim 31 is formed with a pair of mounting openings 32 and 33 for mounting the module. A rim 26 is formed about the front face of the module and a fuse holder 21 is mounted in the module 10. As best shown in FIGS. 4 and 7, the fuse holder 21 has a pair of downwardly extending arms 41 and 44 formed with notches 42 and 46 adjacent their lower ends for detachably receiving a fuse holding plate 43 therein. Fuse holder clamps 61 and 62 are mounted on the upper surface of plate 43 relative to FIGS. 4 and 7 and fuse holder clamps 63 and 64 are mounted on the lower surfaces of the plate 43 relative to FIGS. 4 and 7. Fuses 17 and 18 are received in clamps 63 and 64 and the fuse 16 is received in the fuse clamp 61. A shorting bar 19 is mounted in the fuse clamp 62.

The invention can be used for both European and U.S. fusing. Eropean fuses are mounted in both sides of the line and, thus, the fuses 17 and 18 would be mounted in operational position if a European equipment was being fused and U.S. fuses are mounted in only a single line so the fuse 16 would be used with an electrical connecting jumper 19. In operation, relative to FIGS. 4 and 7, the fuses in the circuit are on the underside of the mounting plate 43. It is also to be noted that the U.S. and European fuses have different lengths and the invention has fuse contacts 71 and 72 73, 74 and 76 for respectively positioned so as to engage the ends of the fuses.

The contacts 71 through 76 as illustrated in FIG. 4 are mounted below extensions 81 and 82. A lower divider 83 extends up between the fuses 17 and 18 as illustrated in FIG. 4 and, thus, the space betweens the contacts 71 and 72 and the divider 83 is such that an operator cannot insert his finger into the fuse contact receptacle and receive an electrical shock. Removal of the power cord is required in order to access the fuse area, although the power can be connected after removal of the fuse assembly.

Figure 2:
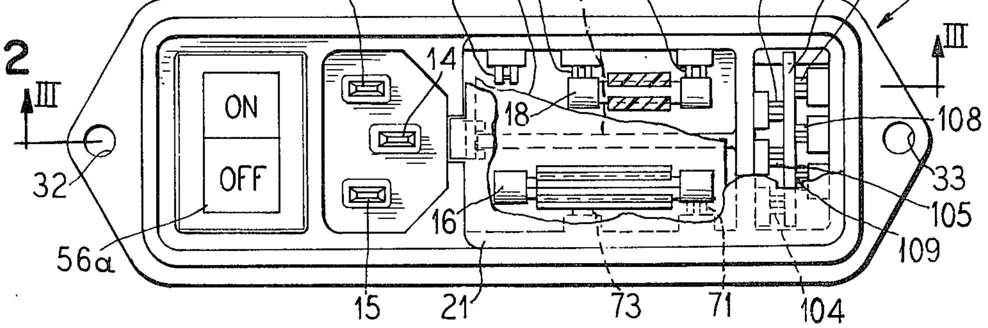
FIG. 2 is a top plan view of the invention.

As shown in FIG. 2, a printed circuit board 36 is mounted on the rear surface of the module 10 for making electrical connections between the various input and output contacts and the various components and a voltage changing board 91 is received in a socket 92 formed in the module. The voltage changing board is illustrated in FIGS. 6, 5, 10 and 11, for example, and comprises an insulating board 94 with a first plurality of contacts 95, 96, 97 and mounted on a first side thereof. The second side of the board illustrated in FIGS. 11 and 5 has electrical contacting areas 99, 100 and 101 formed thereon. Through contacts 102 and 103 connect contacts 95 and 99 and contacts 98 and 100, respectively. The board 91 is receivable in contacts 104 through 109 which are connected to the connectors 12.

Figure 5:
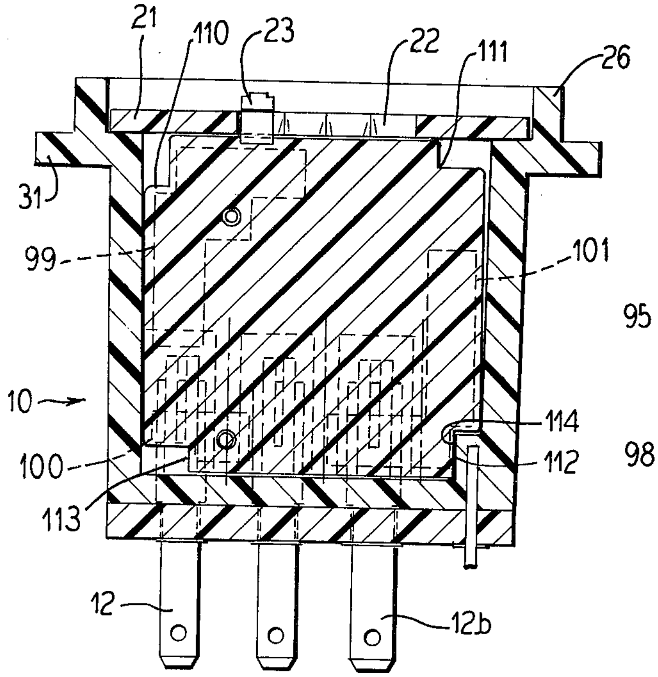
FIG. 5 is a sectional view taken on line V—V from FIG. 3.
Figure 6:
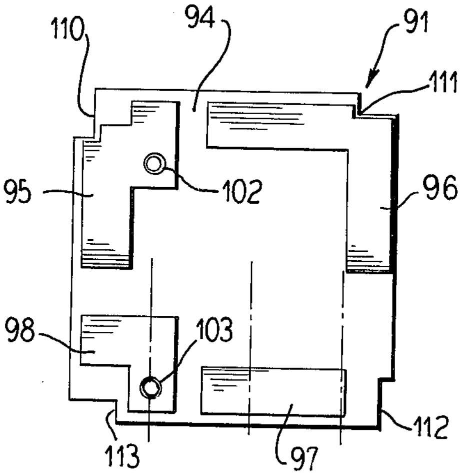
FIG. 6 illustrates the voltage selecting board.

In operation, the board 91 is placed into the contacts 104-109 so that the desired voltage will be selected. The board 91 is formed with indexing slots 110, 111, 112 and 113 into which an indexing projection 114 mounted to the inner wall of the housing 11 can be received as illustrated in FIG. 5. For example, in a particular embodiment, the following voltages can be selected by placing the board 91 in different angular orientations, 100 volts, 120 volts, 220 volts, and 240 volts. In another arrangement, shown in FIG. 9 which required another board either 120 or 240 volts can be selected. When the board is in the proper orientation to pick the selected voltage the indicator 23 is moved in the slot 22 to the selected voltage. If the fuses on board 43 are proper for the selected voltage and the selected equipment, a change need not be made and the equipment is ready for operation. However, if the European fuses 17 and 18 are connected to engage the contacts 71, 72, 73 and 76 and is desired to operate with the U.S. fuse, then the plate 21 is removed which pulls the plate 43 and the fuses from the fuse sockets. The space between tab 24 and partition 37, is exposed when the power cord is removed, allowing for small screw driver insertion which will allow removal of fuse assembly as shown in FIG. 7. Then the plate 43 is removed from the notches 42 and 46 and the plate 43 is turned over so that the fuse 16 and the shorting bar 19 will extend downwardly relative to FIG. 7. Then the fuse unit 21 is remounted into the housing 11 and the fuse 16 will be mounted between contacts 72 and 74 and the shorting bar 19 will be mounted between contacts 71 and 73.

FIG. 8 comprises an electrical schematic illustrating the incoming pair of leads 13, 14 and 15 with lead 14 grounded. The switch contacts **56*a* and 56*b* connect the leads 13 and 15 to leads 150 and 151 which are connected to the contacts 105 and 107 which engage board 92. Certain ones of the segments 95, 96, 97, 98, 99, 100 and 101 of the conducting areas on the opposite sides of board 94 will engage the contacts 105 and 107 depending on the orientation of the board and a voltage of 100, 120, 220 and 240 can be selected by removing the board 94 and placing it in different orientations to select the desired one of the four voltages. The customer transformer 161 has contacts 160, 160*a*, 160*b*, 160*c* and 160*d* and the orientation of the board 94 provides the selected voltage to the customer's equipment. FIG. 9** illustrates a modified form of the invention.

FIG. 9 is an option provided by substituting a voltage selector board similar to board 94. Fusing is irrelevant to this option.

The fusing in FIGS. 8 and 9 is optional as either one fuse 16 or the fuses 17 and 18 can be selected by repositioning plate 43.

It is seen that the present invention provides novel A.C. power entry module which the fuses can be easily replaced and changed. The desired voltage can be selected by merely selecting the correct orientation of the board 94.

Although the invention has been described with respect to preferred embodiments, it is not to be so limited as changes and modifications can be made which are within the full intended scope of the invention as defined by the appended claims.

We claim as our invention:

1. An A.C. power module comprising, a housing, input and output power terminals mounted in said housing, electrical contact fuse receiving means mounted in said housing, a fuse carrying means detachably received in said housing and including a plate which can be moved to at least two positions, first fuse holding means mounted on a first planar side of said plate, second fuse holding means mounted on a second side of said plate such that when said plate is in a first position, a fuse or fuses in said first fuse holding means is connected to said fuse receiving means and when said plate is in the second position a fuse or fuses in said second fuse holding means is connected to said fuse receiving means and circuit means connecting said fuse receiving means and said input and output power terminals.

2. An A.C. power module according to claim 1 wherein said fuse receiving means are positioned in said housing in a position such that an operator cannot make contact when said fuse carrying means has been removed.

3. An A.C. power module according to claim 2, wherein said fuse carrying means has a pair of parallel extending arms with a pair of holding means thereon for receiving said plate therein.

4. An A.C. power module according to claim 2, including an on-off switch connected to said input power terminals.

5. An A.C. power module according to claim 2, including a projection mounted to said housing adjacent said fuse receiving means to restrict access by an operator to said fuse receiving means.

6. An A.C. power module according to claim 2, including a voltage changing board detachably receivable in voltage changing contacts which are connected to said circuit means such that as said voltage changing board is moved to different positions different voltages can be selected.

7. An A.C. module according to claim 6 including a slide indicator and indicia movably mounted on said housing to indicate the selected voltage.

* * * * *